US009195521B2

United States Patent
Zhao et al.

(10) Patent No.: US 9,195,521 B2
(45) Date of Patent: Nov. 24, 2015

(54) METHODS FOR SOFTWARE SYSTEMS AND SOFTWARE SYSTEMS USING THE SAME

(71) Applicant: TENCENT TECHNOLOGY (SHENZHEN) CO., LTD., Guangdong (CN)

(72) Inventors: Yuanxue Zhao, Guangdong (CN); Ansong Yao, Guangdong (CN); Chao Zhong, Guangdong (CN); Zhiming Nie, Guangdong (CN); Kai Xu, Guangdong (CN); Lanqi Song, Guangdong (CN); Lei Jiang, Guangdong (CN)

(73) Assignee: Tencent Technology (Shenzhen) Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/960,588

(22) Filed: Aug. 6, 2013

(65) Prior Publication Data

US 2014/0013340 A1 Jan. 9, 2014

Related U.S. Application Data

(63) Continuation of application No. PCT/CN2013/078764, filed on Jul. 3, 2013.

(30) Foreign Application Priority Data

Jul. 5, 2012 (CN) .......................... 2012 1 0231776

(51) Int. Cl.
G06F 9/54 (2006.01)
(52) U.S. Cl.
CPC ........................................ G06F 9/54 (2013.01)
(58) Field of Classification Search
None
See application file for complete search history.

(56) References Cited

U.S. PATENT DOCUMENTS

| 5,509,129 A * | 4/1996 | Guttag et al. ................. 712/203 |
| 2003/0123748 A1* | 7/2003 | Sebot et al. ................... 382/254 |
| 2008/0143730 A1 | 6/2008 | Lindholm et al. |
| 2008/0195843 A1* | 8/2008 | Muniandy ....................... 712/31 |
| 2009/0160867 A1* | 6/2009 | Grossman ..................... 345/522 |

(Continued)

FOREIGN PATENT DOCUMENTS

| CN | 1601479 A | 3/2005 |
| CN | 101097529 A | 1/2008 |
| CN | 101178662 A | 5/2008 |

(Continued)

OTHER PUBLICATIONS

Written Opinion for 11201403809Y.

*Primary Examiner* — Tuan Dao
(74) *Attorney, Agent, or Firm* — Brinks Gilson & Lione

(57) ABSTRACT

A non-transitory computer-readable storage medium may comprise a set of instructions for creating a subsystem process independent from a main system process for data computation. The set of instructions may direct at least one processor to perform acts of: in a main system process, receiving a user input; in the main system process, sending the user input to a subsystem process, the subsystem process is independent from and in parallel with the main system process; in the main system process, generating a first computation result according to the user input; in the subsystem process, generating a second computation result in parallel with the main system process according to the user input; in the main system process, receiving the second computation result from the subsystem process; and in the main system process, combining the first computation result and the second computation result.

16 Claims, 5 Drawing Sheets

(56) References Cited

U.S. PATENT DOCUMENTS

2011/0191092 A1* 8/2011 Mizrachi et al. .............. 703/14
2011/0302583 A1* 12/2011 Abadi et al. .............. 718/102
2012/0192055 A1* 7/2012 Antebi et al. .............. 715/229

FOREIGN PATENT DOCUMENTS

| CN | 101807162 A | 8/2010 |
| CN | 102467488 A | 5/2012 |
| CN | 102541640 A | 7/2012 |

* cited by examiner

METHODS FOR SOFTWARE SYSTEMS AND SOFTWARE SYSTEMS USING THE SAME

PRIORITY STATEMENT

This application is a continuation of International Application No. PCT/CN2013/078764, filed on Jul. 3, 2013, in the State Intellectual Property Office of the People's Republic of China, which claims the benefit of Chinese Patent Application No. 201210231776.5, filed on Jul. 5, 2012, the disclosures of both of which are incorporated by reference herein in their entireties.

FIELD

The present application relates to the field of software. Specifically, the present application relates to methods for software systems and software systems using the same.

BACKGROUND

As a person of ordinary skill in the art knows, a software system means a computer software system, which may be any set of computer-readable instructions (most often in the form of a computer program) that directs a computer processor to perform specific operations. These computer-readable instructions generally are stored in a computer-readable medium, transitory or non-transitory, before being executed by the computer processor.

The software system may comprise system software, support software, and application software, and may be part of a computer system. The software system may comprise a subsystem, which supplements and enhances the functions of the software system. Generally, a subsystem comprises three parts, namely user processing, logic processing, and interface drawing.

To integrate a subsystem entirely into the software system, some methods may adopt a plan to operate all the functions of the subsystem together with the main system of the software in a same process. For example, some methods may adopt a plan to operate logics for user input processing, logic processing, and drawing of a subsystem interface together in a series of software processes. Here, a process is an instance of a computer program that is being executed by a computer processor.

FIG. 1 shows a flowchart of processes for an existing software system implementation method. As shown in FIG. 1, after a user input is received, the basic workflow of the software process is executed in the following order: first, in process 120, the subsystem processes the user input; and then in process 130, the main system processes the user input; in process 140, the main system performs logic processing; in process 150, the subsystem performs logic processing; then in process 160, the main system interface is drawn and/or generated; at last, in process 170, the subsystem interface is drawn and/or generated.

Because the main system and the subsystem are executed in the same process, the time spent on any part of the subsystem will have direct influence on the performance of the main system. Suppose the time spent on the user input is t0; the time spent on the processes of the main system, i.e., the process 120 for user input processing, the process 140 for logic processing, and the process 160 for interface drawing, is t1, t2, and t3, respectively; the time spent on the processes of the subsystem, i.e., the process 130 for user input processing, the process 150 for logic processing, and the process 170 for interface drawing, is t4, t5, and t6, respectively. If the process plan shown in FIG. 1 is adopted, the total time (t) that a computer processor spent on each cycle of the software is: $t=t0+t1+t2+t3+t4+t5+t6$. This equation shows that the time spent by the subsystem (t4, t5, and t6) is directly added to the total time spent by the software.

In terms of user experience, the smaller the value of t, the smoother the user's perception of the software during running of the software system; or the larger the value of t, the slower the running speed of the software system perceived by a user. Take a software system with a visual user interface (UI, e.g., an electronic game having a multimedia user interface) for example. The smoothness of the user interface from the software that a user may perceive may be measured by the frame rate (fps, i.e., the number of frames of pictures that is displayed per second). Suppose that the average time spent on a cycle of the game is 20 ms (that is, $t=t0+t1+t2+t3=20$ ms), then the average frame rate of the game is 50 frames per second (fps=1000 ms/20 ms=50 frames) before a subsystem is added. Suppose, however, that the time spent on each cycle of the subsystem is 5 ms, the time now spent on each cycle of the game becomes 25 ms ($t=t0+t1+t2+t3+t4+t5+t6=20+5=25$ ms) after the subsystem is added. In this case, the frame rate is reduced to 40 frames per second (fps=1000 ms/25 ms=40 frames). Thus adding the subsystem reduces the efficiency of the entire game system by 10 frames. Furthermore, t3, t4 and t5 may vary depending on the complexity of the subsystem. For example, a subsystem interface may require only 10 elements to fulfill its designated functions, but in order to meet the system requirements, the number of interface elements may have to be increased to 100. In such scenario, the time spent on processing the 100 interface elements will increase considerably, which will have even greater impact on the entire system, thus seriously affects the smoothness of user interface of the software system.

SUMMARY

According to an aspect of the present application, a computer device may comprise at least one processor and at least one computer-readable storage medium. The at least one computer-readable storage medium may comprise a set of instructions for creating a subsystem process independent from a main system process for a user interface generation. The at least one processor may be in communication with the at least one computer-readable storage medium, and may be configured to execute the set of instructions stored in the computer-readable storage medium and configured to: in a main system process, receive a user input, send the user inputs to a subsystem process, and generate a first computation result according to the user input; in the subsystem process, generate a second computation result in parallel with the main system process according to the user input; in the main system process, receive the second computation result from the subsystem process and combine the first computation result and the second computation result.

According to an aspect of the present application, a non-transitory computer-readable storage medium may comprise a set of instructions for creating a subsystem process independent from a main system process for a user interface generation. The set of instructions may direct at least one processor to perform acts of: in a main system process, receiving a user input, sending the user inputs to a subsystem process, and generating a first computation result according to the user input; in the subsystem process, generating a second computation result in parallel with the main system process according to the user input; in the main system process, receiving the second computation result from the subsystem process and combining the first computation result and the second computation result.

According to an aspect of the present application, a computer device may comprise a subsystem module device having a subsystem process and configured to generate a user interface; a main system module device having a main system process and configured to execute the main system process, receive a user input, create the subsystem process independent from and executed in parallel with the main system process, and send the user input to the subsystem module device. The main system module device may be configured to generate a first computation result according to the user input. The subsystem module device may be configured to generate a second computation result in parallel with the main system process according to the user input. The main system module device may be configured to receive the second computation result from the subsystem process. Further, the main system module device may be configured to combine the first computation result and the second computation result.

According to an aspect of the present application, the main system module device may be configured to receive an instruction for loading a subsystem and create the subsystem process in accordance with the instruction for loading the subsystem.

According to an aspect of the present application, the main system process may be configured to process the user input and a first service logic according to the user input; generate the first computation result upon completion of a first service logic. The subsystem module device may be configured to process the user input and a second service logic according to the user input; and generate the second computation result upon completion of the second service logic processing.

According to an aspect of the present application, the first computation result may be a first pixel graph of a user interface associated with the main system process; the second computation result may be a second pixel graph of a user interface associated with the main system process; and the main system module device may be configured to combine the first pixel graph with the second pixel graph, forming a complete user interface.

BRIEF DESCRIPTION OF THE DRAWINGS

The above and other features and advantages will become more apparent by describing in detail example embodiments thereof with reference to the attached drawings in which.

DETAILED DESCRIPTION OF THE INVENTION

Figure 1:
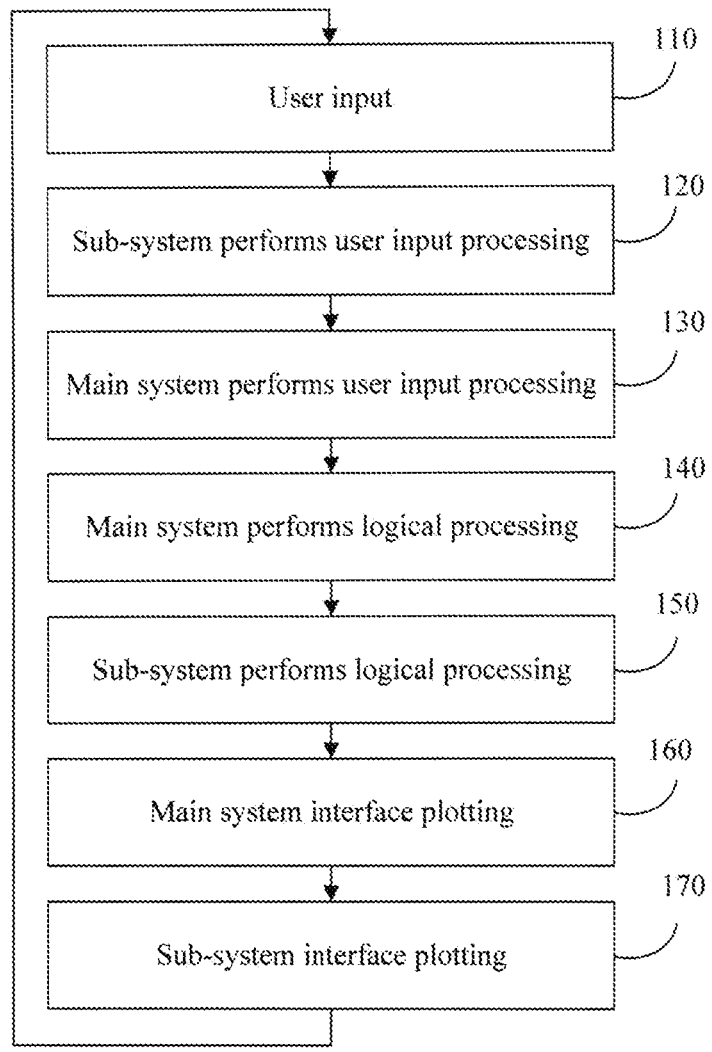
FIG. 1 is a schematic diagram illustrating a flowchart of processes of an existing software system implementation method.

Example embodiments will now be described more fully with reference to the accompanying drawings, in which the example embodiments are shown. The example embodiments may, however, be embodied in many different forms and should not be construed as being limited to the example embodiments set forth herein; rather, the example embodiments are provided so that this application will be thorough and complete, and will fully convey the concept of the invention to one skilled in the art. The drawings may be exaggerated for clarity and not necessarily in scale. Like reference numerals in the drawings denote like elements, and thus, their description will not be repeated.

Figure 5:
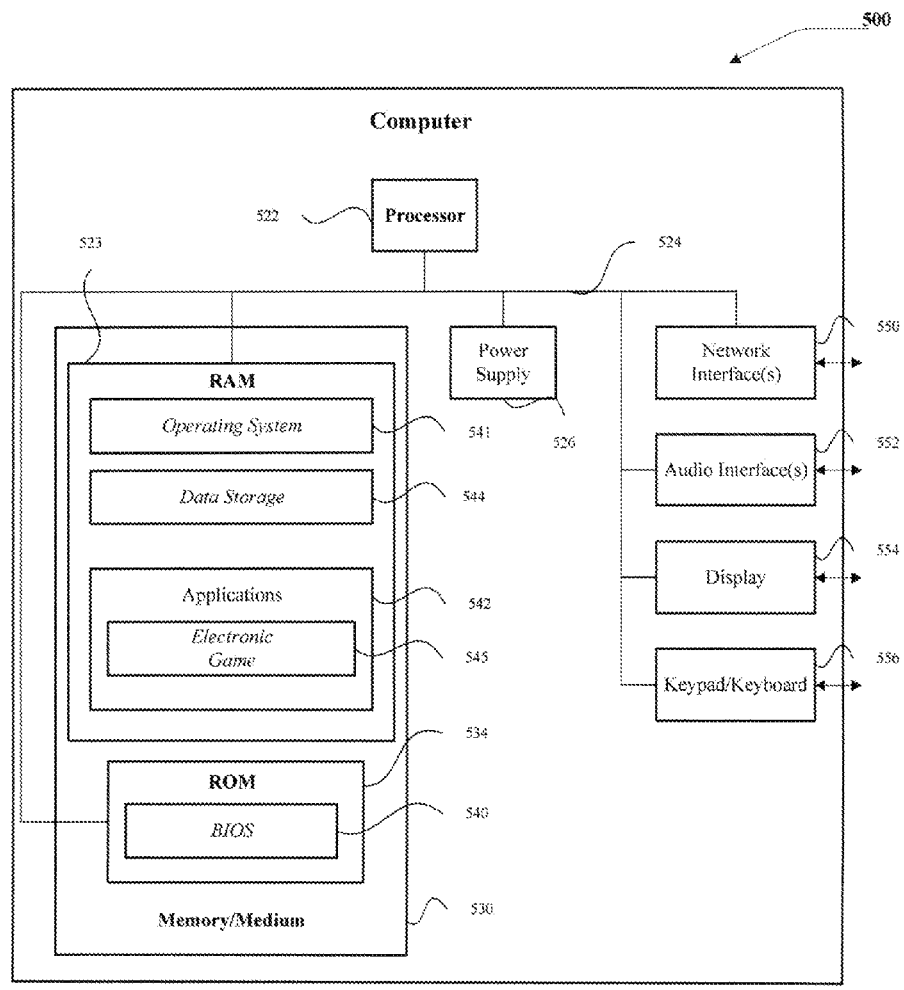
FIG. 5 is a schematic diagram illustrating an example embodiment of a computer.

FIG. 5 is a schematic diagram illustrating an example embodiment of a computer that may execute methods and software systems of the present application. A computer 500 may be a computing device capable of executing a software system. The computer 500 may, for example, be a device such as a personal desktop computer or a portable device, such as a laptop computer, a tablet computer, a cellular telephone, or a smart phone. The computer 500 may also be a server that connects to the above devices locally or via a network.

The computer 500 may vary in terms of capabilities or features. Claimed subject matter is intended to cover a wide range of potential variations. For example, the computer 500 may include a keypad/keyboard 556. It may also comprise a display 554, such as a liquid crystal display (LCD), or a display with a high degree of functionality, such as a touch-sensitive color 2D or 3D display. In contrast, however, as another example, a web-enabled computer 500 may include one or more physical or virtual keyboards, and mass storage medium 530.

The computer 500 may also include or may execute a variety of operating systems 541, including an operating system, such as a Windows™ or Linux™, or a mobile operating system, such as iOS™, Android™, or Windows Mobile™. The computer 500 may include or may execute a variety of possible applications 542, such as an electronic game 545. An application 542 may enable communication with other devices via a network, such as communicating with another computer via an Internet network for online electronic games.

Further, the computer 500 may include one or more non-transitory processor-readable storage media 530 and one or more processors 522 in communication with the non-transitory processor-readable storage media 530. For example, the non-transitory processor-readable storage media 530 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 530 may store sets of instructions, or units and/or modules that comprise the sets of instructions, for conducting operations described in the present application. The one or more processors may be configured to execute the sets of instructions and perform the operations in example embodiments of the present application.

For example, the computer 500 may include a main system module device, which may be comprised of the non-transitory storage medium, and a processor, which may be configured to execute a main system process. The computer 500 may also include a subsystem process module device, which may also be comprised of a non-transitory memory and a processor configured to execute a subsystem process and to generate a user interface. The main system module device may create the subsystem process such that it is independent from the main system process. The main system module device may receive and send a user input to the subsystem process module device. The main system module device may generate a first computation result according to the user input. The subsystem module device may generate a second computation result that is in parallel with the main system process according to the user input. The main system process module device may receive the second computation result. The main system module device then may combine the first computation result and the second computation result as explained in more detail herein.

Merely for illustration, only one processor will be described in computers that execute operations in the following example embodiments. However, it should be note that the computers in the present application may also comprise multiple processors, thus operations that are performed by one processor as described in the present application may also be jointly or separately performed by the multiple processors. For example, if in the present application a processor of a computer executes both step A and step B, it should be understood that step A and step B may also be performed by two different processors jointly or separately in the computer (e.g., the first processor executes step A and the second processor executes step B, or the first and second processors jointly execute steps A and B).

Figure 2:
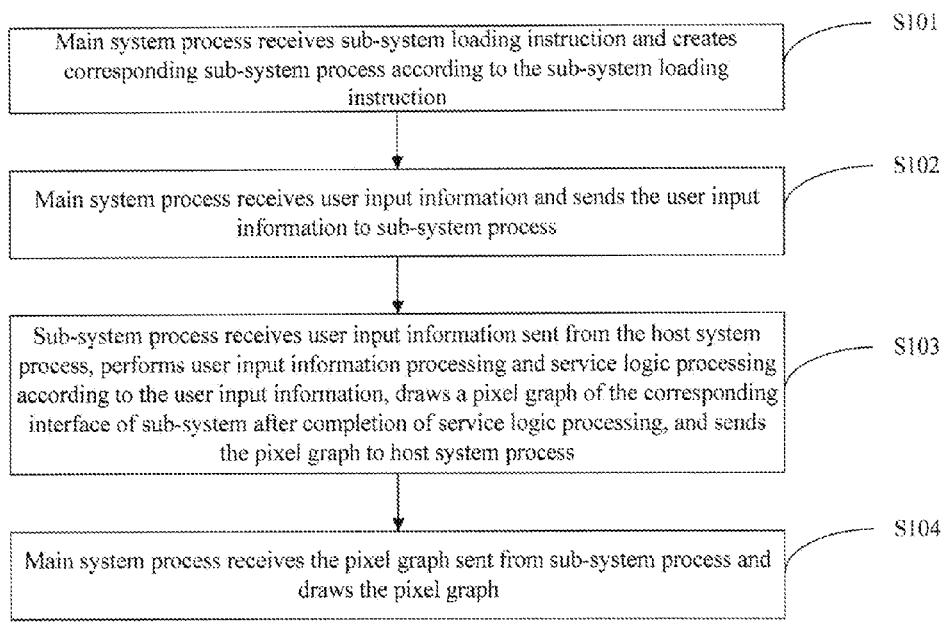
FIG. 2 is a schematic diagram illustrating a flowchart of processes of a software system according to an example embodiment of the present application.

FIG. 2 is a schematic diagram illustrating a flowchart of processes of a software system according to an example embodiment of the present application. In process S101, a main system process may receive a subsystem loading instruction (i.e., an instruction for loading a subsystem). The subsystem loading instruction may be an instruction executed by the processor according to the software and may instruct the processor to create a corresponding subsystem process. The subsystem process may be independent from and in parallel with the main system process.

In process S102, the main system process may receive a user input and send the user input to the subsystem process.

In process S103, the subsystem process may receive the user input from the main system process. The subsystem process may then process the user input and service logic according to the user input. Upon completion of the service logic processing, the subsystem process may generate a computation result for the subsystem and send the computation result to the main system process. According to the example embodiment, the computation result may be a pixel graph. Thus the subsystem process may draw and/or create a pixel graph for an interface (e.g., user interface) of the subsystem and send the pixel graph to the main system process.

In process S104, the main system process may receive the pixel graph from the subsystem process and may draw the pixel graph.

According to the example embodiment, after receiving the subsystem loading instruction, the main system process may create an independent subsystem process for the subsystem. As a result, the subsystem may become independent and separate from the main system and may conduct independent data processing such as, but not limited to, user input processing, service logic processing, and interface drawing. The corresponding computer processes of the subsystem (e.g., computer processes of user input processing, service logic processing, and interface drawing, etc.), accordingly, may become separate computer processes independent from the main processes. Consequently, only two processes (e.g., two steps) may be left to the main system process: sending information of the user input to the subsystem process; and receiving and drawing the pixel graph that is sent back from the subsystem. Complexities of the two processes that remain in the main system process may be relatively consistent for different user inputs, and may vary little as the complexity of the subsystem varies. Thus the influence of the subsystem on the performance of the main system may remain unchanged, and the possibility of influence that the subsystem may have on the stability of the main system may be low.

Therefore, with a subsystem process independent from the main system process, the method not only may meet the functional requirements of the software system but also may enhance the performance of the software system and the smoothness requirement from users to the operation of the software system.

In addition to sending the received user input information to the subsystem process and receiving and drawing the pixel graph sent back from the subsystem process, the main system process may also execute its own processes (i.e., the main system process does not delegate its own assignments). For example, the processes of the main system may include, but not limited to, processing of the received user input information, its own service logic processing, and generating a computation result according to the user input. According to the example embodiment, the computation result may be a main system user interface (e.g., a pixel graph). Thus the main system process may generate and/or draw a main system user interface (e.g., the pixel graph) upon completion of the service logic processing. Alternatively, the computation result may be other visual and/or audial result. Further, the present application intends to cover the broadest scope of computation results that a computer process may obtain.

Figure 3:
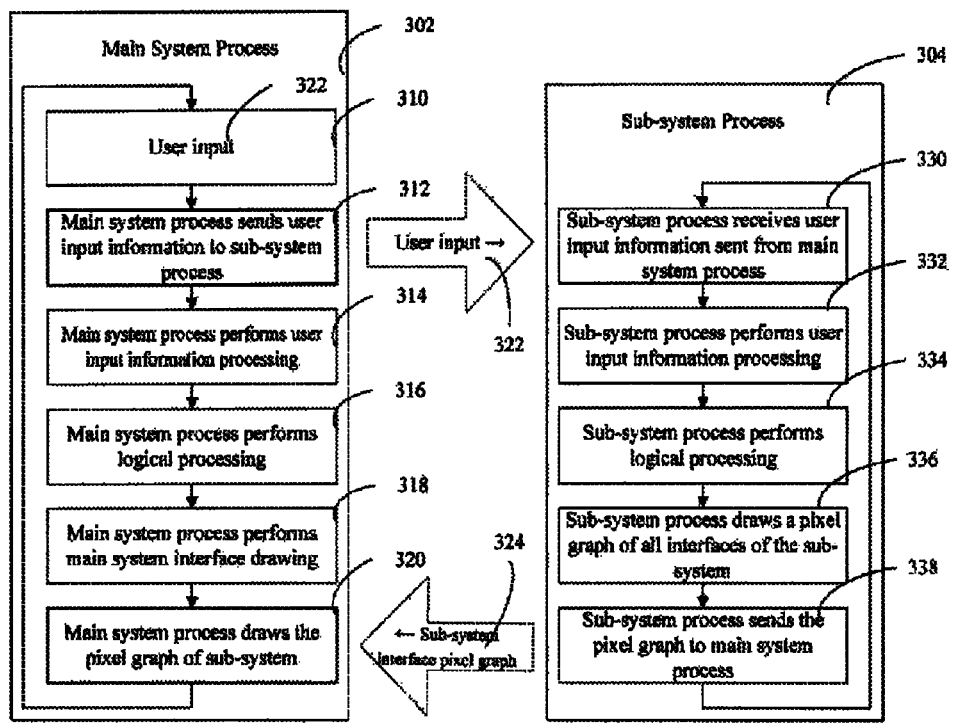
FIG. 3 is a schematic diagram illustrating a flow of a main system process and a subsystem process according to an example embodiment of the present application.

FIG. 3 is a schematic diagram illustrating a flow of a main system process and a subsystem process according to example embodiments of the present application. In process 310, the main system may first receive a user input 322. After the main system has received the user input 322, the main system and subsystem may execute their respective data processing independently according to their respective independent computer processes based on the user input 322.

As shown in FIG. 3, in process 312, after receiving the user input, the main system process 302 may forward and/or send the user input 322 to the subsystem process 304. The subsystem process 304 may be independent from and in parallel with the main system process 302. In process 330, the subsystem process 304 may receive the user input 322 and processes the user input 322 and service logic according to the user input 322. During this time, the main system process 302 may not wait for the processing result 324 from the subsystem process, but rather directly go to a next process and proceed with the rest of processing assignments. Here, the user input 322 may refer to, but not limited to, any information or instructions entered by a user via an interaction device, such as a mouse, a keyboard, or a touch screen.

When forwarding the user input 322 to the subsystem process 304, the main system process 302 may not need to "understand" the detailed content of the user input 322 (e.g., the main system process may not analyze the content of the user input). Instead, the main system process 302 may simply "directly transmit" the user input 322 to the subsystem process 304. Furthermore, the main system process 302 may not need to wait for the processing result 324 of the subsystem process, but rather return immediately and proceed with the next processing assignment.

As shown in FIG. 3, the processing assignments of the main system process 302 may include: processing of the user input 314, processing of the service logic 316, generating a first computation result for the main system according to the user input 318, and upon completion of service logic processing, receiving a second computation result from the subsystem 304.

According to the example embodiment, the first computation result may be a first pixel graph (e.g., a user interface) and the second computation result may be a second pixel graph. Thus the main system process 302 may generate and/or draw the first pixel graph, and upon completion of service logic processing 316, receive and draw and/or generate the second pixel graph 324 returned by the subsystem process 304.

The specific processing of the received user input and that of the service logic of the main system process may vary depending on the type of the software system. Different types of software systems may lead to different user input processing and service logic processing of the main system due to different functions implemented by the software systems.

In process 330, the subsystem process 304 may receive the user input 322 from the main system process 302. After receiving the user input 322 forwarded by the main system process 302, the processing that the subsystem process 304 executes may include, but not limited to, processing of the received user input 332, processing of the service logic 334, creating and/or drawing the pixel graph of the corresponding subsystem interface 336 upon completion of the service logic processing, and sending the second pixel graph 324 to the main system process 302 so that the main system process 302 may draw the second pixel graph 324 and display it to the user. The specific processing of the received user input and that of the service logic of the subsystem process may vary depending on the type of the subsystem. Different types of software systems may lead to different user input processing and service logic processing of the subsystem due to different functions implemented by the software systems and different types of subsystems loaded.

According to an example embodiment, the second pixel graph 324 created and/or drawn by the subsystem process may be a picture having a same size as the area occupied by the subsystem (i.e., the pixel graph 324 created by the subsystem process 336 may be a portion of a user interface created by the main system process 318, and the size of the second pixel graph 324 may be the same as the size of the portion on the user interface that the subsystem process is in charge of). Only the second pixel graph 324 may be needed regardless of the content of the subsystem (i.e., regardless of the processing the subsystem process executes, the main system process may only need the subsystem process to generate the second pixel graph 324). After drawing the second pixel graph 324, the subsystem process may send the entire second pixel graph 324 to the main system process; alternatively, the subsystem process may send only the part of the second pixel graph 324 that corresponds to the updated area on the user interface that the subsystem process is in charge of (i.e., the second pixel graph 324 may be an updated portion of a computation result of the subsystem process 304 at a current time in comparison with a reference computation result of the subsystem process 304 at a previous time). Both options for generating and/drawing the pixel graph may be available according if needed.

According to an example embodiment of the present application, in process 320, the main system process 302 may combine, by the processor of a computer (e.g., computer 500), the first pixel graph and the second pixel graph, generating and/or drawing and/or forming a complete user interface.

According to the example embodiments shown in FIG. 3, suppose that the time that the user spends on entering the user input 310 is t0, the time that the main system process spends on the three processing, i.e., the processing of the user input 314, the processing of the service logic 316, and drawing the main system interface 318, is t1, t2, and t3, respectively, the time that the main system process spends on sending the user input to the subsystem process 312 is t7, the time that the main system process spends on drawing the pixel graph 320 sent back from the subsystem process is t8. Then in a cycle of processing the user input, the time t that a computer processor spends on executing the main system process may be t=t0+t1+t2+t3+t7+t8. That is to say, the influence of the subsystem process upon the time and performance of the main system process may only involve t7 and t8.

According to the example embodiment of the present application, when sending the user input to the subsystem process, the main system process may not need to either "understand" the content of the user inputs 322 or wait for the processing result 324 from the subsystem process. Therefore, the time (t7) that the main system process spends on sending the user input to the subsystem process 312 may be regarded as a small constant value. Consequently, the main system process may be featured with simpler logic, faster processing speed, and independency of the service logic processing of the subsystem process.

Likewise, when the main system process 320 draws the pixel graph, which is the portion of the user interface that the subsystem is in charge of, the complexity of drawing the pixel graph may be irrelevant to the complexity of logic of the subsystem and the complexity of the interface itself, because the corresponding processing logic for the main system process may involve only drawing a pixel graph. Therefore, the time (t8) that the main system process 320 spends on drawing the pixel graph sent from the subsystem process may also be a small constant value.

That is to say, both t7 and t8 may be regarded as small constant values, and the subsystem process 304 may have little influence upon the performance of the main system process. Furthermore, the influence may be irrelevant to the service logic complexity of the subsystem process 304 and may not substantially vary when the complexity of the subsystem varies. Therefore, the influence upon the performance of the main system process may be constant or substantially constant.

In addition, with respect to the stability of the software system, the two processes remained in the main system process may be consistent with respect to system resource consumption (such as time consumption), as described earlier. Therefore, there may be less possibility that the two processes 312, 320 will have any large influence upon the stability of the main system process 302. Since the service logic process 334 of the subsystem process 304 itself is isolated from the main system process 302, the operation of the main system process 302 may not be affected even if major faults such as system stuck and breakdown occur in the subsystem process 304, which may further ensure the stability of the main system process 302.

Here, when the main system process 302 is creating a subsystem process 304, it may create different subsystem processes for different types of subsystems.

In order to enhance the robustness of software systems, the technical solution of the present application may also implement some fault tolerance mechanisms. For example, by detecting the state of a subsystem process 304, the main system process 302 may restart the subsystem process 304 when detecting any abnormality of the subsystem process 304. Various possible methods may be used to detect abnormalities of a subsystem process 304.

Figure 4:
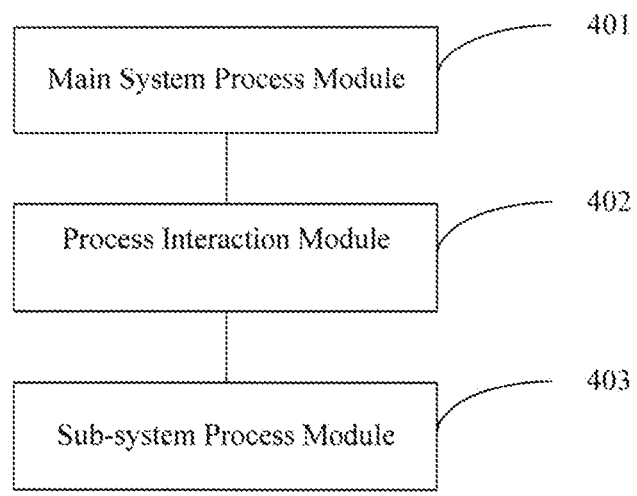
FIG. 4 is a schematic diagram illustrating a structure of the software system according to an embodiment of the present application.

FIG. 4 is a schematic diagram illustrating a structure of the software system according to an embodiment of the present application. The software system in this embodiment may comprise a main system process module 401, a process interaction module 402, and a subsystem process module 403.

The main system process module 401 may receive a subsystem loading instruction and user input, and may create and/or draw a pixel graph of the subsystem process received by the process interaction module 402.

The process interaction module 402 may create a corresponding subsystem process in the subsystem process module 403 according to the subsystem loading instruction received by the main system process module 401, and may send the user input received by the main system process module 401 to the subsystem process module 403, and may receive the pixel graph sent from the subsystem process module 403. The subsystem process may be independent from and in parallel with the main system process.

The subsystem process module 403 may receive the user input from the process interaction module 402, process the user input and service logic according to the user input, create and/or draw the pixel graph of the corresponding subsystem interface upon completion of a service logic processing thereof, and send the pixel graph to the process interaction module.

Here, the main system process module 401 may also execute related processing tasks of the main system process. Therefore, the main system process module 401 may also be used to process the user input and service logic according to the received user input, and to draw the main system interface upon completion of the service logic processing.

The process interaction module 402 may be independent from the main system process module 401 or may be set as a part of the main system process module 401. Different settings may be made as needed.

When creating the corresponding subsystem process according to the subsystem load instruction, the process interaction module 402 may create different subsystem processes according to different types of subsystems. When different subsystem processes are created for the different types of subsystems, these different subsystem processes may be associated with different corresponding subsystem process modules 403, respectively. FIG. 4 is an example of a software system which has only one subsystem process module. However, it is the intention of the present application that the example embodiments disclosed herein also include software systems having multiple subsystem and subsystem processes.

Furthermore, the pixel graph generated and/or drawn by the subsystem process may correspond to an area of a user interface generated and/or drawn by the main system process. The pixel graph drawn by the subsystem process modules 403 may be a picture having the same size as the area on the user interface. Only a pixel graph may be needed from the subsystem process, regardless of the content of the subsystem (i.e., regardless of the processing the subsystem process executes, the main system process may only need the subsystem process to generate the pixel graph). After drawing the pixel graph, the subsystem process module 403 may send the complete pixel graph drawn to the process interaction module 402; alternatively, it may send only the part of the pixel graph corresponding to an updated area in the subsystem interface to the process interaction module 402 (i.e., the subsystem process may send only the part of the pixel graph that corresponds to the updated area on the user interface of which the subsystem process is in charge). The main system process module 401 may generate and/or draw the user interface accordingly. Both options may be available for the software system depending on the need of the software system.

Example embodiments of the present application may also provide settings of some fault tolerance mechanisms to enhance the robustness of software systems. For example, the process interaction module 402 may be configured to detect the state of the subsystem process module 403 and may restart and/or reboot the subsystem process in the subsystem process module 403 when detecting any abnormality of the subsystem process module 403, such as system stuck/freeze, not responding, and/or system breakdown. Various possible methods may be used to detect abnormalities of the subsystem process module and various possible methods may be used to restart a subsystem process in the subsystem process module.

The software systems according to the present application may adopt the same methods as the methods in the present application described in the above.

While example embodiments of the present application relate to methods and systems of creating a subsystem process independent from a main system process for user interface generation, the methods and systems may also be applied to other applications. For example, in addition to pixel graphs, the computation result may be other forms of visual and/or audial result. Thus combining the computation results from the main system process and the subsystem process may be combining the visual and/or audio results from the main system process and subsystem process. The present application intends to cover the broadest scope of computation results that a computer process may obtain.

Thus, example embodiments illustrated in FIGS. 1-5 serve only as examples to illustrate several ways of implementation of the present application. They should not be construed as to limit the spirit and scope of the example embodiments of the present application. It should be noted that those skilled in the art may still make various modifications or variations without departing from the spirit and scope of the example embodiments. Such modifications and variations shall fall within the protection scope of the example embodiments, as defined in attached claims.

We claim:

1. A non-transitory computer-readable storage medium comprising a set of instructions for creating a subsystem process independent from a main system process for data computation, wherein when executed by at least one processor, the set of instructions directs the at least one processor to perform acts of:

from the main system process, creating a subsystem process independent from and in parallel with the main system process, wherein the main system process is an instance that the processor is executing a computer program and the subsystem process includes an instance that the processor is executing the computer program;

in the main system process, receiving a user input;

in the main system process, sending the user input to the subsystem process;

in the main system process, generating a first pixel graph of a first portion of a user interface according to the user input;

in the subsystem process, generating a second pixel graph of a second portion of the user interface according to the user input;

in the main system process, receiving the second pixel graph from the subsystem process; and in the main system process, combining the first pixel graph and the second pixel graph into a pixel graph of the user interface, wherein the second pixel graph is an updated portion of a pixel graph of the subsystem process at a current time in comparison with a reference pixel graph of the subsystem process at a previous time.

2. The non-transitory computer-readable storage medium according to claim 1, wherein the set of instructions directs the at least one processor to perform acts of:

in the main system process, receiving an instruction to load a subsystem; and in the main system process, creating the subsystem process in accordance with the instruction for loading the subsystem.

3. The non-transitory computer-readable storage medium according to claim 1, wherein the set of instructions directs the at least one processor to generate the first pixel graph by:
in the main system process, processing the user input and a first service logic according to the user input; and
in the main system process, generating the first pixel graph upon completion of the first service logic processing.

4. The non-transitory computer-readable storage medium according to claim 1, wherein the set of instructions directs the at least one processor to generate the second pixel graph by:
in the subsystem process, processing the user input and a second service logic according to the user input; and
in the subsystem process, generating the second pixel graph upon completion of the second service logic processing.

5. The non-transitory computer-readable storage medium according to claim 1, wherein combining the first pixel graph with the second pixel graph comprises combining the first pixel graph with the second pixel graph to form an entire pixel graph of the user interface.

6. A non-transitory computer-readable storage medium comprising a set of instructions for creating a subsystem process independent from a main system process for data computation, wherein when executed by at least one processor, the set of instructions directs the at least one processor to perform acts of:
from the main system process, creating a subsystem process independent from and in parallel with the main system process, wherein the main system process is an instance that the processor is executing a computer program and the subsystem process includes an instance that the processor is executing the computer program;
in the main system process, receiving a user input;
in the main system process, sending the user input to the subsystem process;
in the main system process, generating a first pixel graph of a first portion of a user interface according to the user input;
in the subsystem process, generating a second pixel graph of a second portion of the user interface according to the user input;
in the main system process, receiving the second pixel graph from the subsystem process; and
in the main system process, combining the first pixel graph and the second pixel graph into a pixel graph of the user interface, wherein the set of instructions directs the at least one processor to perform acts of:
in the main system process, detecting, by the processor, an abnormal state of the subsystem process; and
restarting, by the processor, the subsystem process when the abnormal state of the subsystem process is detected.

7. A computer-implemented method, comprising:
from a main system process, creating, by a processor, a subsystem process independent from and in parallel with the main system process, wherein the main system process is an instance that the processor is executing a computer program and the subsystem process includes an instance that the processor is executing the computer program;
in the main system process, receiving, by a processor, a user input;
in the main system process, sending, by a processor, the user input to a subsystem process;
in the main system process, generating, by a processor, a first pixel graph of a first portion of a user interface according to the user input;
in the subsystem process, generating, by a processor, a second pixel graph of a second portion of the user interface according to the user input;
in the main system process, receiving, by a processor, the second pixel graph from the subsystem process; and
in the main system process, combining, by a processor, the first pixel graph and the second pixel graph into a pixel graph of the user interface,
wherein the second pixel graph is an updated portion of a pixel graph of the subsystem process at a current time in comparison with a reference pixel graph of the subsystem process at a previous time.

8. The computer-implemented method according to claim 7, further comprising:
in the main system process, receiving, by a processor, an instruction to load a subsystem; and
in the main system process, creating, by a processor, the subsystem process in accordance with the instruction for loading the subsystem.

9. The computer-implemented method according to claim 7, wherein generating the first pixel graph comprises:
in the main system process, processing, by a processor, the user input and a first service logic according to the user input; and
in the main system process, generating, by a processor, the first pixel graph upon completion of the first service logic processing.

10. The computer-implemented method according to claim 7, wherein generating the second pixel graph comprises:
in the subsystem process, processing, by a processor, the user input and a second service logic according to the user input; and
in the subsystem process, generating, by a processor, the second pixel graph upon completion of the second service logic processing.

11. The computer-implemented method according to claim 7, wherein combining the first pixel graph with the second pixel graph comprises combining the first pixel graph with the second pixel graph to form an entire pixel graph of the user interface.

12. A computer-implemented method, comprising:
from a main system process, creating, by a processor, a subsystem process independent from and in parallel with the main system process, wherein the main system process is an instance that the processor is executing a computer program and the subsystem process includes an instance that the processor is executing the computer program;
in the main system process, receiving, by a processor, a user input;
in the main system process, sending, by a processor, the user input to a subsystem process;
in the main system process, generating, by a processor, a first pixel graph of a first portion of a user interface according to the user input;
in the subsystem process, generating, by a processor, a second pixel graph of a second portion of the user interface according to the user input;
in the main system process, receiving, by a processor, the second pixel graph from the subsystem process; and in the main system process, combining, by a processor, the first pixel graph and the second pixel graph into a pixel graph of the user interface, in the main system process, detecting, by the processor, an abnormal state of the subsystem process; and restarting, by the processor, the subsystem process when the abnormal state of the subsystem process is detected.

13. A computer device, comprising:

a storage medium comprising a set of instructions for creating a subsystem process independent from a main system process for data computation; and a processor in communication with the storage medium, wherein when executing the set of instructions, the processor is directed to:

from a main system process, create a subsystem process independent from and in parallel with the main system process, wherein the main system process is an instance that the processor is executing a computer program and the subsystem process includes an instance that the processor is executing the computer program;

in the main system process, receive a user input;

in the main system process, send the user input to the subsystem process;

in the main system process, generate a first pixel graph of a first portion of a user interface according to the user input;

in the subsystem process, generates a second pixel graph of a second portion of the user interface in parallel with the main system process according to the user input;

in the main system process, receive the second pixel graph from the subsystem process; and in the main system process, combine the first pixel graph and the second pixel graph into a pixel graph of the user interface, wherein the second pixel graph is an updated portion of a pixel graph of the subsystem process at a current time in comparison with a reference pixel graph of the subsystem process at a previous time.

14. The computer device according to claim 13, wherein the processor is further directed to:

in the main system process, receive an instruction to load a subsystem, and in the main system process, create the subsystem process in accordance with the instruction for loading the subsystem.

15. The computer device according to claim 13, wherein the processor is further directed to:

in the main system process, process the user input and a first service logic according to the user input;

in the main system process, generate the first pixel graph upon completion of the first service logic;

in the subsystem process, process the user input and a second service logic according to the user input; and in the subsystem process, generate the second pixel graph upon completion of the second service logic.

16. The computer device according to claim 13, wherein the first pixel graph is combined with the second pixel graph to form an entire pixel graph of the entire user interface.

* * * * *